April 30, 1929.  M. A. BERGER  1,711,402
METHOD OF MAKING DENTAL CROWNS
Filed Jan. 11, 1928
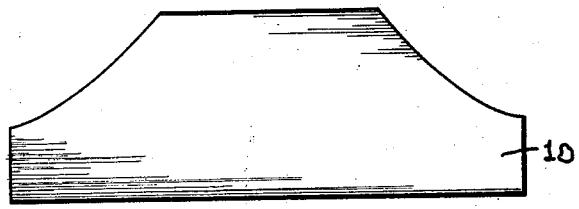
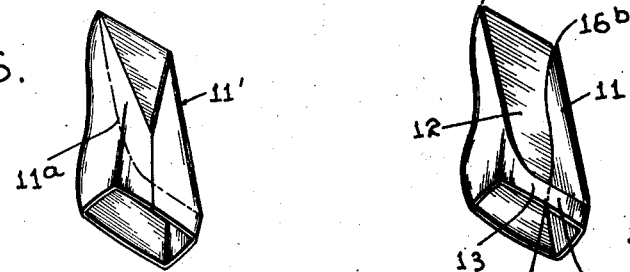
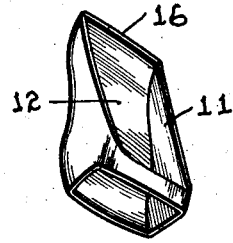
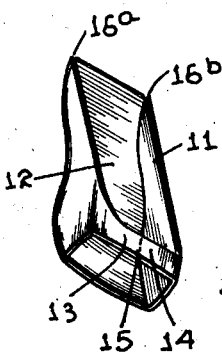
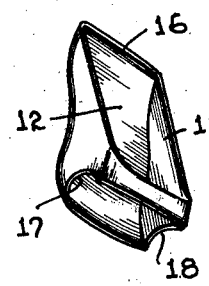
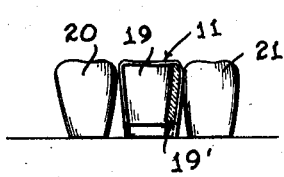
INVENTOR.
Marcus A. Berger
BY Harry Cohen
ATTORNEY.

Patented Apr. 30, 1929.

1,711,402

UNITED STATES PATENT OFFICE.

MARCUS A. BERGER, OF HOMESTEAD, FLORIDA.

METHOD OF MAKING DENTAL CROWNS.

Application filed January 11, 1928. Serial No. 246,027.

The present invention relates to dental crowns and more particularly to the method of making the same.

In making open faced gold crown it has heretofore been proposed to cut a band of gold, the ends of which are soldered together to form a closed band. The closed band is then placed upon the tooth, trimmed, and shaped thereto, and then its face is cut away to provide the opening on the labial surface of the tooth. This method involves a comparatively great waste of material and it is an important object of this invention to obviate such waste.

According to the present invention, the band of gold is cut to the proper shape, according to the size of tooth, in the first instance. The ends of the band are then brought together and soldered, and the crown may then be burnished and contoured, or the soldering may be done after the step of burnishing and shaping. The crown may be reinforced by soldering the joint to the desired thickness. The incisal edge may then be formed on the crown and cut-outs formed to allow for the length of the tooth. This method of making the crown reduces waste of material to a minimum and results in a saving of from 40% to 50% of the material heretofore used in making crowns of the open faced type.

The method of cutting the blank to the desired shape in the first instance to result in an open faced crown thereby obviating subsequent cutting of the closed or fitted or closed and fitted band, makes possible a better fitting of the crown and reduces the time required to make and fit it.

The crown thus produced may be porcelain faced. With this crown lost portions of teeth may be built up, and the crown may be used as an abutment or attachment for a bridge.

For a more complete understanding of the invention and the objects thereof, reference is to be had to the accompanying drawings and the following description.

In the drawings:

Fig. 1 is a plan view of the blank cut as closely as possible to the size and shape of the tooth;

Fig. 2 is a perspective view of the blank shaped to the contour of the tooth and the ends brought together and soldered;

Fig. 3 is a perspective view of the crown with the incisal edge formed;

Fig. 4 is a perspective view of the finished crown;

Fig. 5 is a front view showing the crown applied to a tooth a portion of which is to be restored by a porcelain filling or the like.

Fig. 6 is a perspective view of a modified partially formed crown.

Referring to the drawings in detail, the reference character 10 designates a band of gold cut as nearly as possible to shape necessary to produce the crown for proper fitting to the tooth without any or substantial subsequent removing of material to produce an open-faced crown. After the band 10 is formed, the same is applied to the tooth and shaped as much as possible to the contour of the tooth, the ends of the band being brought together and soldered, yielding the crown in the semi-finished condition shown in Fig. 2 and designated by the reference character 11. The crown has an open face 12 for exposing the labial surface of the tooth to which it is applied. The sides of the crown 11 are connected by projections 13 and 14 soldered together at 15.

The crown is then treated to form the incisal tip 16. To this end the crown is cut either at 16$^a$ or 16$^b$ or at both 16$^a$ and 16$^b$, that is, between the back of the crown and the sides 11 near the tip thereof. The tip is then folded over, any excess of material removed, and the portions adjacent the slits 16$^a$ or 16$^b$ on the back and sides of the crown soldered together. Before soldering, the crown may be contoured, the incisal edge being formed over the tooth surface.

The finished crown, shown in Fig. 4, may be applied to a tooth, part of which is to be restored, as illustrated in Fig. 5. The crown may be applied to a tooth 19 positioned between adjacent teeth 20 and 21. The tooth 19 may have a portion 19' to be restored, for example. The crown 11 formed and applied to the tooth will be filled thereby except for the lost portion as at 19' which may be filled according to approved dental practice, and the face of the restored tooth may have a facing preparation applied thereto.

In some cases, it may be desirable to form the crown from a blank which will give the approximate shape of the open face instead of substantially the exact shape. In this event, the blank 10 may be of a different configuration which when folded will result in the partially formed crown 11', shown in Fig. 6. The partially formed crown 11, shown in Fig. 2 may then be formed by cutting away part of the front along the dotted lines 11ª.

It will be obvious that while a crown of a certain shape is illustrated, the shape of the crown is not vital to the present invention but may be varied and will, of course, be varied to suit the demands of the tooth to which it is to be applied. The shape and size of the opening in the face may be varied, and other changes may be made without departing from the invention defined in the appended claims.

Having thus described the invention, what is claimed and desired to be secured by Letters Patent of the United States is:

1. The method of making a crown comprising forming a band to the shape of the tooth and treating the same to form the incisal edge which comprises cutting the band between the two adjacent sides at both ends of the incisal edge, forming the incisal edge portion, and soldering the adjacent sides at the cut portion thereof.

2. The method of making a dental crown which comprises cutting a band to the shape required to provide a covering for the lingual surface of the tooth and an integral incisal edge and an open labial face formed by bringing the ends of the band together, and forming the incisal edge portion on the crown by first cutting away material at the incisal edge portion, forming the incisal edge portion against the tooth, and soldering said incisal edge in position.

In testimony whereof I hereunto affix my signature.

MARCUS A. BERGER.